J. R. HEICHEL & G. E. GORZ.
DETACHABLE SEAT FOR LADDERS.
APPLICATION FILED OCT. 16, 1911.
1,090,712.
Patented Mar. 17, 1914.
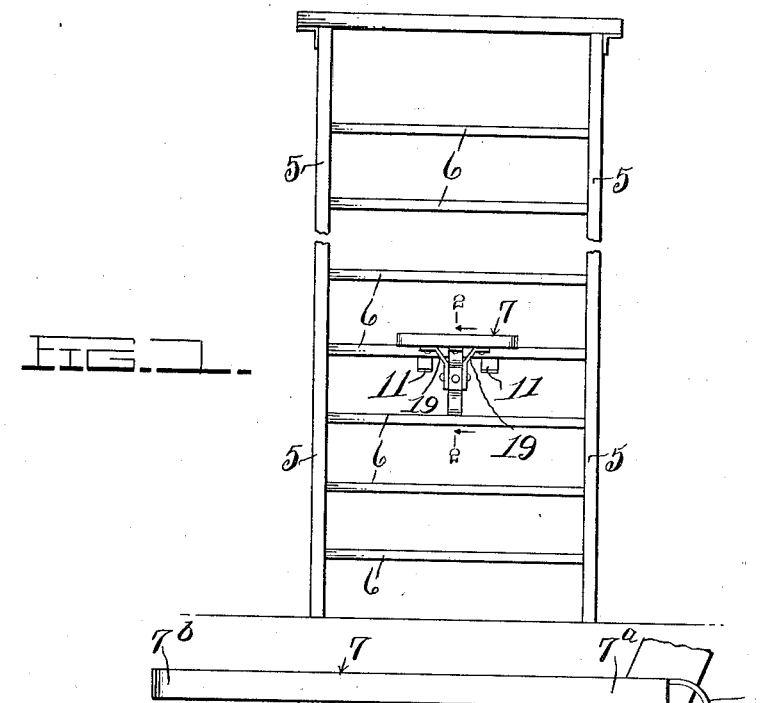
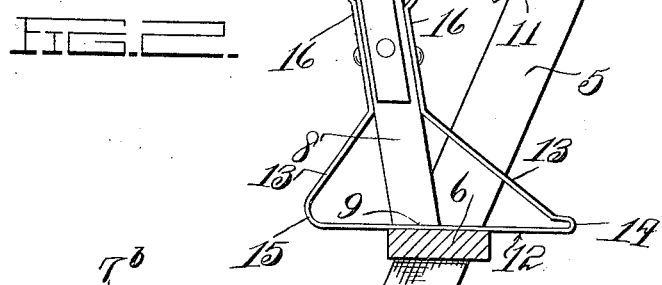
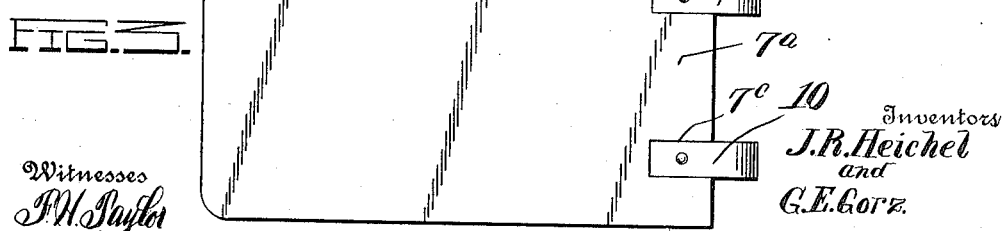
Witnesses
Inventors
J. R. Heichel
and
G. E. Gorz
By
Attorneys

UNITED STATES PATENT OFFICE.

JAMES R. HEICHEL AND GEORGE E. GORZ, OF ASHLAND, OHIO.

DETACHABLE SEAT FOR LADDERS.

1,090,712.   Specification of Letters Patent.   Patented Mar. 17, 1914.

Application filed October 16, 1911. Serial No. 654,820.

*To all whom it may concern:*

Be it known that we, JAMES R. HEICHEL and GEORGE E. GORZ, citizens of the United States, residing at Ashland, in the county of Ashland, State of Ohio, have invented certain new and useful Improvements in Detachable Seats for Ladders; and we do hereby declare the following to be a full, clear, and exact description of the invention, such as will enable others skilled in the art to which it appertains to make and use the same.

This invention relates to an improvement in seats adapted for attachment to the rungs of a ladder.

The principal object of the invention is to provide a seat having a standard adapted to rest on a rung, said standard and seat being so arranged that the device is adapted for use with ladders of varying degrees of inclination, the standard bottom having an elongated foot.

A further object of the invention is to provide a seat attachment for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawing: Figure 1 is a front view of a ladder showing a seat constructed in accordance with our invention attached thereto, Fig. 2 is an enlarged sectional view through the ladder taken on the line 2—2 of Fig. 1, showing the detachable seat in elevation, and Fig. 3 is a top plan view of the seat.

Like reference numerals designate corresponding parts in all the figures of the drawing.

Referring to the drawing, the reference numerals 5—5 indicate the rails of a ladder, which are connected by a series of flat rungs 6.

Our invention comprises a detachable seat for ladders consisting of an oblong board 7 constituting a seat, the rear end $7^a$ thereof being seated upon one of the rungs 6 and the forward end $7^b$ projecting outwardly beyond the rails 5. This seat 7 is of a width considerably less than the distance between the rails 5, and is adapted to be centrally positioned therebetween.

Centrally secured to the underside of the seat 7 by any suitable means is a rearwardly inclined depending standard 8 having its lower end 9 beveled to correspond to and rest upon the next lower rung 6. The upper face of the rear end $7^a$ of the seat 7 is formed adjacent the side edges with recesses $7^c$—$7^c$. Disposed within each recess $7^c$ and secured therein by screws or any other suitable means is one end of a flat spring 10. This spring extends beyond the rear end of the seat, and is curved downwardly and thence forwardly to form an inclined free end 11 adapted for engagement under the respective rung 6.

In order to more thoroughly support the seat 7, there is provided a single length of strap metal 12 which is centrally secured to the beveled end 9 of the standard 8 by any suitable means. The end portions of this strap extend in advance and in rear of the standard 8, and are then respectively bent toward the standard, as indicated by the reference numerals 13—13 to respectively form a forwardly projecting foot 14 and a rearwardly projecting foot 15. The end portions of the strap thence extend along the front and rear faces of the standard 8, as indicated by the reference numerals 16—16, and are secured by screws or other suitable fastening means. The extreme ends thence respectively extend forwardly and rearwardly, as indicated by the reference numerals 17 and 18 respectively to the seat 7, and are secured thereto by screws or other suitable means, said end portions 17 and 18 constituting front and rear braces for the seat. In order to further brace the seat 7 from lateral movement, there is provided a pair of lateral braces 19—19 of strap iron or any other suitable construction which are respectively secured to the seat and to the standard.

In operation, when it is desired to attach the seat to any pair of rungs, the rear end $7^a$ of the seat is positioned upon a rung 6, as clearly illustrated in Fig. 2 of the drawing, the spring hooks 10 preventing any forward movment of the seat and also preventing any downward movement of the front end 7ᵇ thereof. The feet 14 and 15 which extend rearwardly and in advance of the standard 8 rest upon a respective rung 6, and thereby serve to insure a sufficient bearing for the standard 8. It will also be observed that by reason of the standard 8 being centrally disposed with respect to the seat, all lateral tilting movement of the seat will be prevented by reason of the fact that the spring hooks 10 are disposed at either side of the seat and of the standard.

What is claimed is:

A detachable seat for ladders including in combination, a seat adapted to have its rear end seated upon a rung of a ladder, means to hold said seat on said rung comprising a pair of U-shaped hooks having diverging arms, one arm of each hook being secured to the upper side of said seat and the other arm of each hook extending beneath said seat in spaced relation to the bottom of the seat, a supporting leg centrally depending from the seat for engagement with the next lower rung, said leg being formed from a single length of strap metal having its central portion bent to form a foot arranged at right angles to the rung, said foot being elongated in the direction transverse to the rung whereby the rung may engage the foot at different portions of its length, the ends being bent inwardly from the foot in spaced parallel relation and terminating in outwardly directed end portions and having connections with the seat.

In testimony whereof, we affix our signatures, in presence of two witnesses.

JAMES R. HEICHEL.
GEORGE E. GORZ.

Witnesses:
C. P. GONGUER,
W. S. ROUSH.

---

Copies of this patent may be obtained for five cents each, by addressing the "Commissioner of Patents, Washington, D. C."